United States Patent
Sato

(10) Patent No.: US 7,057,680 B2
(45) Date of Patent: Jun. 6, 2006

(54) LIQUID CRYSTAL DEVICE HAVING DISCOTIC LIQUID CRYSTAL AND ROD-SHAPED LIQUID CRYSTAL IN MUTUALLY SEPARATE PHASES

(75) Inventor: Koichi Sato, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/910,405

(22) Filed: Aug. 4, 2004

(65) Prior Publication Data
US 2005/0001971 A1 Jan. 6, 2005

Related U.S. Application Data

(62) Division of application No. 09/826,878, filed on Apr. 6, 2001, now Pat. No. 6,801,292.

(30) Foreign Application Priority Data

Apr. 7, 2000 (JP) .............................. 2000-106379
May 10, 2000 (JP) .............................. 2000-137431

(51) Int. Cl.
*G02F 1/1334* (2006.01)
(52) U.S. Cl. .......................... 349/94; 349/86; 349/88; 349/141; 349/183; 349/186
(58) Field of Classification Search ............ 349/86–94, 349/183, 186, 141; 428/1.1
See application file for complete search history.

(56) References Cited

U.S. PATENT DOCUMENTS 5,056,898 A * 10/1991 Ma et al. ................ 349/94
5,305,126 A * 4/1994 Kobayashi et al. ......... 349/94
5,635,105 A 6/1997 Kawata et al. ......... 252/299.01
5,688,437 A 11/1997 Sato et al. ............ 252/299.61
5,730,900 A * 3/1998 Kawata ................ 252/299.01
5,812,227 A 9/1998 Toshida et al. ............. 349/88
6,061,113 A 5/2000 Kawata ..................... 349/117
6,128,064 A 10/2000 Moriyama et al. ......... 349/173
6,221,444 B1 4/2001 Okada et al. ............ 428/1.25
6,262,788 B1 7/2001 Hanrahan et al. .......... 349/117
6,429,914 B1 * 8/2002 Kubota et al. ............... 349/86
6,444,280 B1 9/2002 Matsuoka et al. ........... 428/1.3
6,485,798 B1 11/2002 Aminaka et al. ........... 428/1.1
6,497,928 B1 12/2002 Sato et al. ................ 428/1.1
6,558,759 B1 5/2003 Chandrasekhar ........... 428/1.3

FOREIGN PATENT DOCUMENTS

DE  41 09 262 A1  10/1991
JP  8-27284  1/1996

OTHER PUBLICATIONS

Christ, et al., Macromol Rapid Commun., "Light Emitting Diodes Based on a Discotic Main . . . ", vol. 18 (1997), pp. 93-98.

(Continued)

*Primary Examiner*—Andrew Schechter
(74) *Attorney, Agent, or Firm*—Fitzpatrick, Cella, Harper & Scinto

(57) ABSTRACT

A liquid crystal device showing performances, such as good viewing angle characteristic, high contrast, high-speed responsiveness, high resolution and high productivity is given by forming a layer of discotic liquid crystal placed in an edge-on and uniaxial alignment state. In the liquid crystal layer, the discotic liquid crystal may preferably assume a nematic discotic layer and co-present with a rod-shaped liquid crystal in mutually separated phases.

2 Claims, 7 Drawing Sheets

OTHER PUBLICATIONS

Schadt, et al., "Voltage-Dependent Optical Activity of a Twisted . . . ", Applied Physics, vol. 18, No. 4 (1971), pp. 127-128.

Kruk, et al., "Infrared Absorption Study of Hexapentyloxytriphenylene . . . ", Liquid Crystals, vol. 14, No. 3 (1993), pp. 807-819.

93 Eurodisplay, p. 397, Reflective mode PDLC displays—Paper white display P. Nolan, M. Tillin, D. Coates, E. Ginter*, E. Lueder*, T. Kallfass, Merck Ltd., Poole, England *Universitat Stuttgart, Stuttgart, Germany.

Ekisho, vol. 1, p. 45 (1997), no translation.

Irds, 1994, p. 183.

* cited by examiner

LIQUID CRYSTAL DEVICE HAVING DISCOTIC LIQUID CRYSTAL AND ROD-SHAPED LIQUID CRYSTAL IN MUTUALLY SEPARATE PHASES

This is a divisional application of Application Ser. No. 09/826,878, filed Apr. 6, 2001 now U.S. Pat. No. 6,801,292.

FIELD OF THE INVENTION AND RELATED ART

The present invention relates to a liquid crystal device for use in a flat panel display, a paper display, a projection display, a light valve for printer, etc.; a liquid crystal composition for use in the liquid crystal device; and a liquid crystal apparatus including the liquid crystal device. The present invention further relates to a phase compensation plate, a viewing angle compensation plate, a liquid crystal switching device, an active-type liquid crystal device, and a liquid crystal apparatus using the liquid crystal device.

CRTs (cathode ray tubes) have been extensively used as the most popular display devices, for motion picture display, for television and video tape recorders, and monitors for personal computers. Based on the operation characteristic, however, a CRT is accompanied with difficulties such that the recognizability of a static picture is lowered due to flicker and scanning fringes caused by an insufficient resolution, and the fluorescent screen thereof is deteriorated due to burning or sticking. Other problems of the CRT are the possible adverse effects of electromagnetic waves emitted therefrom and large power consumption. Further, the CRT structurally has a large rearward volume behind the display surface, thus restricting the facility of information apparatus including the CRT and being unsuitable for space economization in office or home use.

As a type of device solving such problems of the CRT, there has been known a liquid crystal display device including a type using a twisted nematic (TN)-mode liquid crystal as disclosed by M. Schadt and W. Helfrich, "Applied Physics Letters", Vol. 18, No. 4 (Feb. 15, 1971), pp. 127–128. There are also known other liquid crystal device modes, inclusive of in-plane switching mode (IPS), multi-domain vertical alignment mode (MVA), and high-speed switching modes using a smectic liquid crystal, such as ferroelectric liquid crystal (FLC) or anti-ferroelectric liquid crystal (AFLC).

In recent years, as another type of liquid crystal device, TFT-liquid crystal devices have been developed and commercialized. The TFT-liquid crystal device includes a matrix of pixels each provided with a TFT (thin-film transistor) for solving the problem of crosstalk and is produced in display sizes of 10–13 inches at a good productivity owing to a rapid progress in production technology. However, the TFT-liquid crystal device has left problems in production of a larger size panel with a good viewing angle characteristic and in response speed for allowing a frame frequency of 60 Hz or higher desired for satisfactory motion picture reproduction.

These technical problems involved in liquid crystal devices are attributable to viscoelasticities and optical birefringence characteristic of known liquid crystal materials, and there are incessant desires for novel liquid crystal materials, and alignment states thereof, and novel switching modes of liquid crystal devices.

As another problem to be considered, the above-mentioned conventional liquid crystal devices are ordinarily used as a display panel in combination with a backlight (device) by optically modulating a transmitted light passing through the liquid crystal device. Accordingly, the backlight for the liquid crystal device is required to emit a strong light. Further, a consumption power of liquid crystal display apparatus is largely occupied by the backlight. Even when a lithium ion-secondary battery is used for such a liquid crystal display apparatus, a continuous (successive) operation time for, e.g., mobile computing is approximately several hours at the best. Thus, if backlight devices for various liquid crystal devices can be omitted, low power consumption for many information equipment and office equipment is realized, thus leading to suppression of global warming and a terrestrial environment protection.

In the circumstances, a low power consumption-type reflection liquid crystal device without using a backlight has been developed but still leaves room for improvement in its characteristics at present. Further, various products using a projection-type liquid crystal device as a projector have been commercially available from electrical equipment manufacturers as a large picture-size display. In the field of such a liquid crystal projector, however, a further improvement in brightness (luminance) and/or contrast is required. In order to provide a high-brightness liquid crystal device without using a polarizer, light scattering-type liquid crystal devices, such as one of a polymer-dispersed type and one of a polymer network-type have been developed and proposed (e.g., "'93 Eurodisplay", p. 397-). However, these liquid crystal devices are still desired to improve driving characteristics, scattering performance and other characteristics.

SUMMARY OF THE INVENTION

In view of the above-mentioned state of the art, an object of the present invention is to provide a liquid crystal device showing a good viewing angle characteristic, a high contrast and a high resolution at a high productivity.

Another object of the present invention is to provide a liquid crystal device capable of exhibiting high performances, such as a high luminance and a low power consumption.

Another object of the present invention is to provide an optical modulation device, a display device and a liquid crystal apparatus using such a liquid crystal device.

A further object of the present invention is to provide a liquid crystal composition suitably used as a functional material in such a liquid crystal device.

According to the present invention, there is provided a liquid crystal device comprising: a layer of discotic liquid crystal placed in an edge-on and uniaxial alignment state.

According to another aspect of the present invention, there is provided a liquid crystal composition comprising: a discotic liquid crystal and a rod-shaped liquid crystal disposed in mutually separate phases, wherein the discotic liquid crystal is in a nematic discotic phase.

The present invention further provides a liquid crystal device, including a liquid crystal layer comprising a discotic liquid crystal and a rod-shaped liquid crystal disposed in mutually separate phases, wherein the discotic liquid crystal is in a nematic discotic phase.

The present invention further provides a liquid crystal apparatus including a liquid crystal device as described above.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

First Embodiment

As a result of my study, it has been found that a liquid crystal device including discotic liquid crystal molecules aligned in an edge-on and uniaxially aligned state is effective as a viewing angle compensator film for improving the viewing angle characteristic of a nematic liquid crystal device, etc., and provides by itself a wide-viewing angle liquid crystal device capable of switching.

As for alignment states of discotic liquid crystals, it is well known that a discotic liquid crystal is aligned in a side-on alignment state wherein disks of discotic liquid crystal molecules are aligned parallel to the substrates. A hydride alignment state is also known as disclosed in JP-A 9-211444. In addition to the above, there is also known an alignment state called an edge-on alignment state wherein disks of discotic liquid crystal molecules stand vertically with respect to the substrates (as diclosed by G. Kruck, et al., Liquid Crystals, Vol. 14, No. 3, pp. 807–819). The edge-on alignment state can be ordinarily obtained by forming a homeotropic alignment film on the substrates, but it has not been practiced to uniformly and uniaxially control the direction of disk faces, i.e., the discotic director. This is presumably because of a technical difficulty of satisfying in combination an edge-on alignment generally attained by weakening the interaction with a boundary and a uniaxial alignment generally attained by strengthening the interaction with a boundary with respect to a discotic liquid crystal of which the alignment is generally more difficult than a rod-shaped liquid crystal.

Figure 1A:
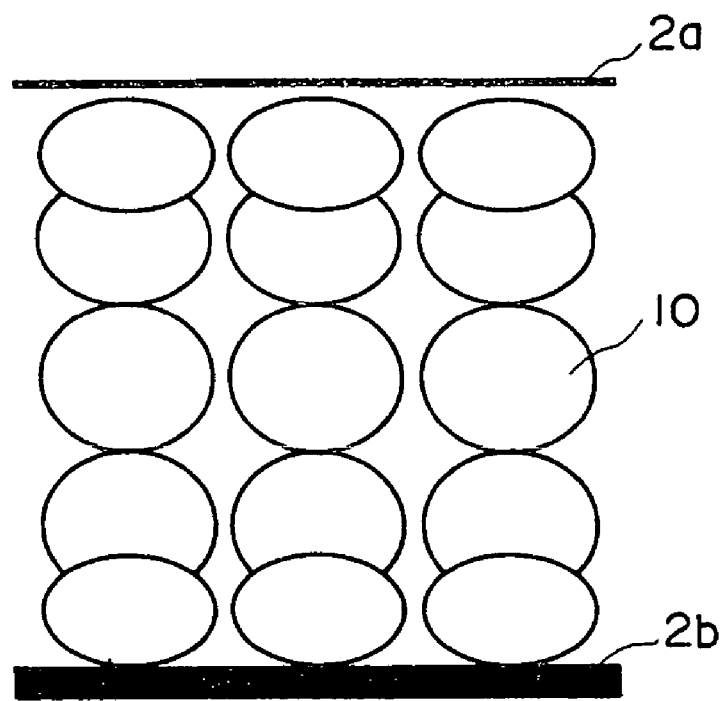
FIGS. 1A and 1B are a schematic front sectional view and a schematic side sectional view respectively, of discotic liquid crystal molecules arranged in an edge-on and uniaxial alignment state.

As a result of my study regarding liquid crystal materials, alignment film materials and preparation conditions, it has become possible to realize an edge-on and uniaxial alignment state of a discotic liquid crystal. FIGS. 1A an 1B are sectional views illustrating an edge-on and uniaxially aligned state of discotic liquid crystal molecules as viewed from a front (FIG. 1A) and a side (FIG. 1B), respectively, of disks 10 of the discotic liquid crystal molecules between a pair of boundaries 2a and 2b (generally given by a pair of substrates, which can be removed thereafter if the alignment state is fixed, e.g., by polymerization as will be described hereinafter). As is understood from FIGS. 1A and 1B, in the edge-on and uniaxial alignment state, the discotic liquid crystal molecules are aligned so that their disk faces stand vertically (at least over a substantial thickness portion) with respect to the boundaries and are directed in one direction parallel to the boundaries.

The discotic liquid crystal used in the present invention may for example have a discotic columnar or a nematic discotic phase, but the nematic discotic phase is preferred because of a relatively high fluidity and easiness of alignment control. More specifically, the discotic liquid crystal may for example comprise a compound having a structure as listed below (wherein specific groups denoted by symbols a, b, c, . . . are indicated after the list) or a composition containing such a compound.

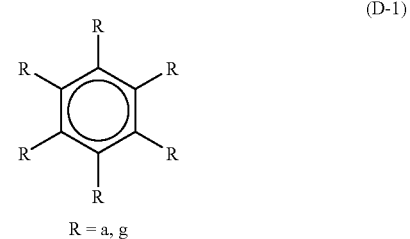

(D-1)

R = a, g

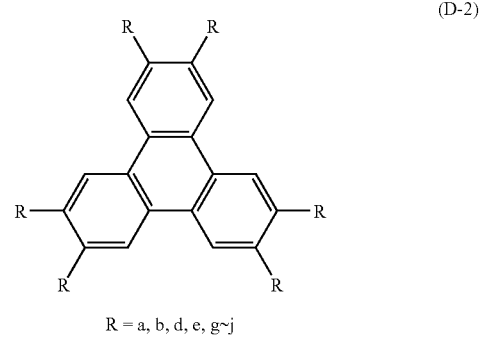

(D-2)

R = a, b, d, e, g~j

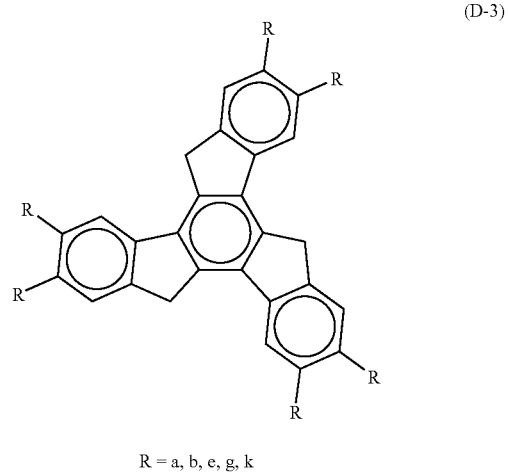

(D-3)

R = a, b, e, g, k (D-4)
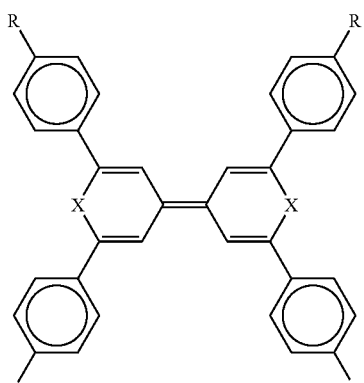
R = c
(D-5)
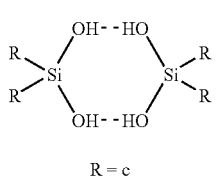
R = c
(D-6)
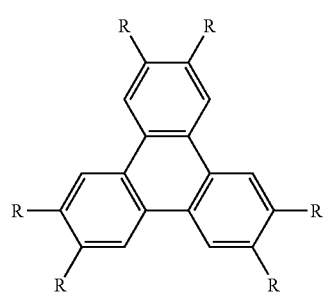
R = b
(D-7)
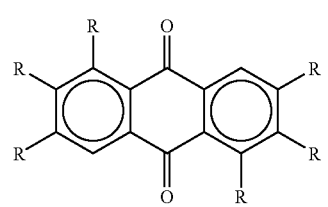
R = a
(D-8)
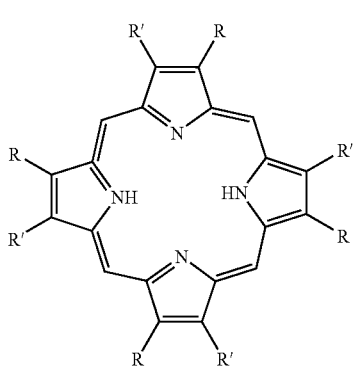
R = f
(D-9)
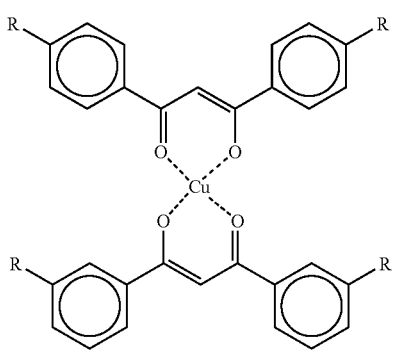
R = c
In (D-1) to (D-9), a to k for each R are groups shown below.
a: $nC_mH_{2m+1}-COO-$
b: $nC_mH_{2m+1}-O-$
c: $nC_mH_{2m+1}-$
d: $nC_mH_{2m+1}-\phenyl-COO-$
e: $nC_mH_{2m+1}-O-\phenyl-COO-$
f: $nC_{12}H_{25}-OCO-(CH_2)_m-$
g: $nC_6H_{13}-CH(CH_3)-CH_2-COO-$
h: $nC_mH_{2m+1}-O-\text{(F}_4\text{-phenyl)}-COO-$
i: $nC_mH_{2m+1}-\text{cyclohexyl}-COO-$
j: $C_2H_5-CH(CH_3)-(CH_2)_3-O-\phenyl-COO-$
k: $nC_mH_{2m+1}-OCO-\phenyl-OCO-$
(D-10)
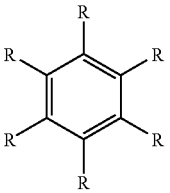

-continued

R: ① n-C₁₁H₂₃ —C(=O)—O—

② n-C₁₂H₂₅O—C₆H₄—C(=O)—O— or

③ n-C₁₂H₂₅O—C₆H₄—N=N—C₆H₄—C(=O)—O—

(D-11)

[Porphyrin structure with eight —(CH₂)₂—CO₂R and —CH₂—CO₂R substituents]

R = n-C₁₂H₂₅—

(D-12)

[Copper phthalocyanine structure with R substituents]

R: C₁₂H₂₅OCH₂—

(D-13)

[Tribenzofuran structure with six OR substituents]

-continued

R: ① n-C₁₂H₂₅O—C₆H₄—C(=O)— or

② n-C₁₃H₂₇—C(=O)—

(D-14)

[Copper bis(dibenzoylmethane) complex with four R-substituted phenyl groups]

R: n-C₁₀H₂₁—

(D-15)

[Bis(2,6-diarylpyran-4-ylidene) structure with four R-substituted phenyl groups]

R: n-C₈H₁₇—

(D-16)

[Tetrathiafulvalene structure with four R-substituted phenyl groups]

R: n-C₁₆H₃₃O—

(D-17)

[Triphenylene structure with six R substituents]

-continued
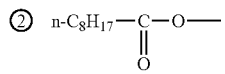
(m = 2, 3, …, 15)
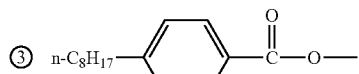
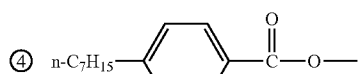
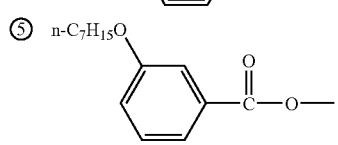
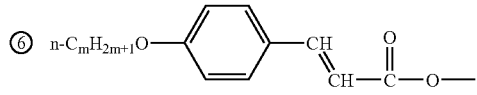
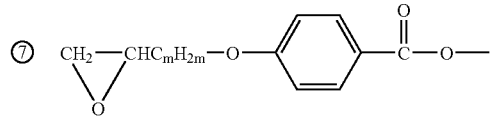
(m = 7, 8, 9, 10)
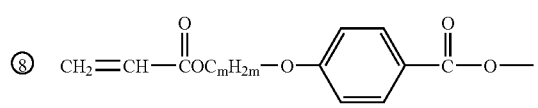
(m = 4, 5, …, 10)
or
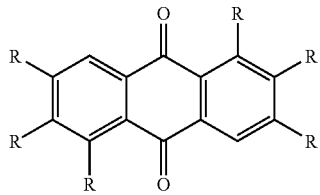
(m = 4, 5, …, 10)
(D-18)
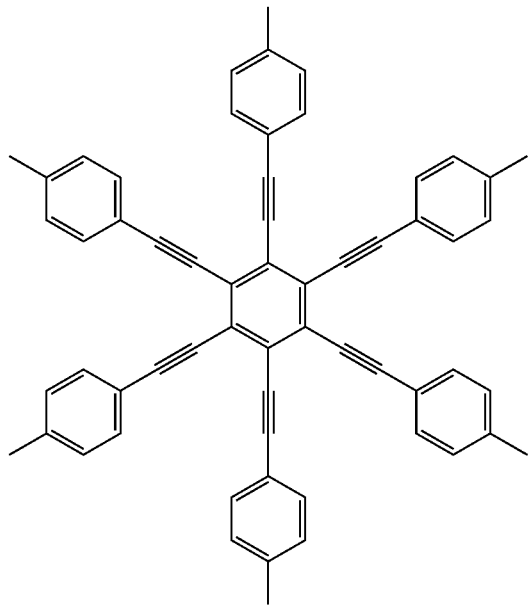
-continued
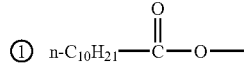
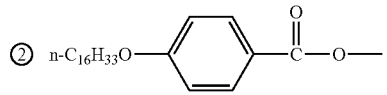
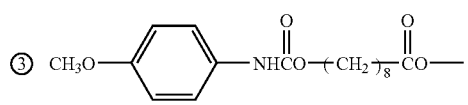
(D-19)
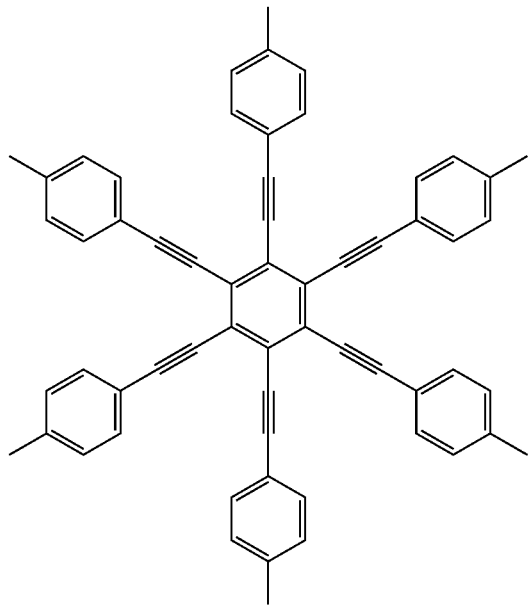
R:  C$_7$H$_{15}$O—
(D-20)
Polymeric discotic liquid crystal compounds as shown below can also be used.

(PMD-1)
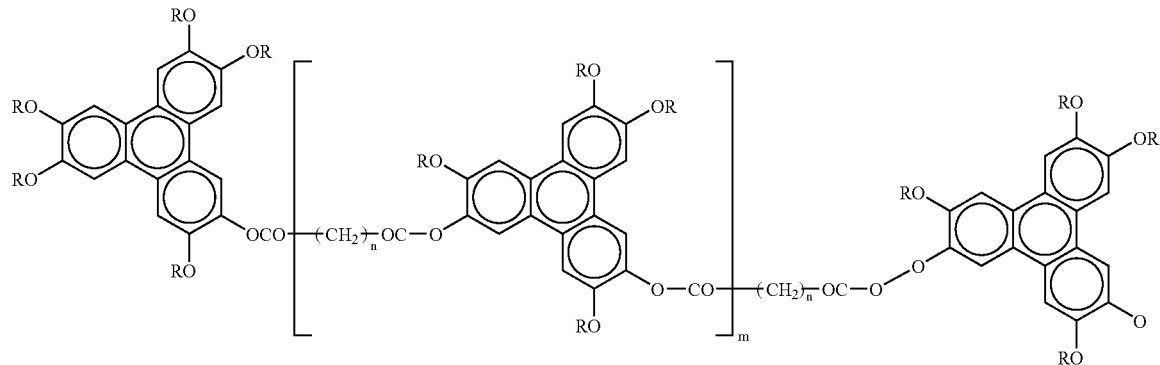
(PMD-2)
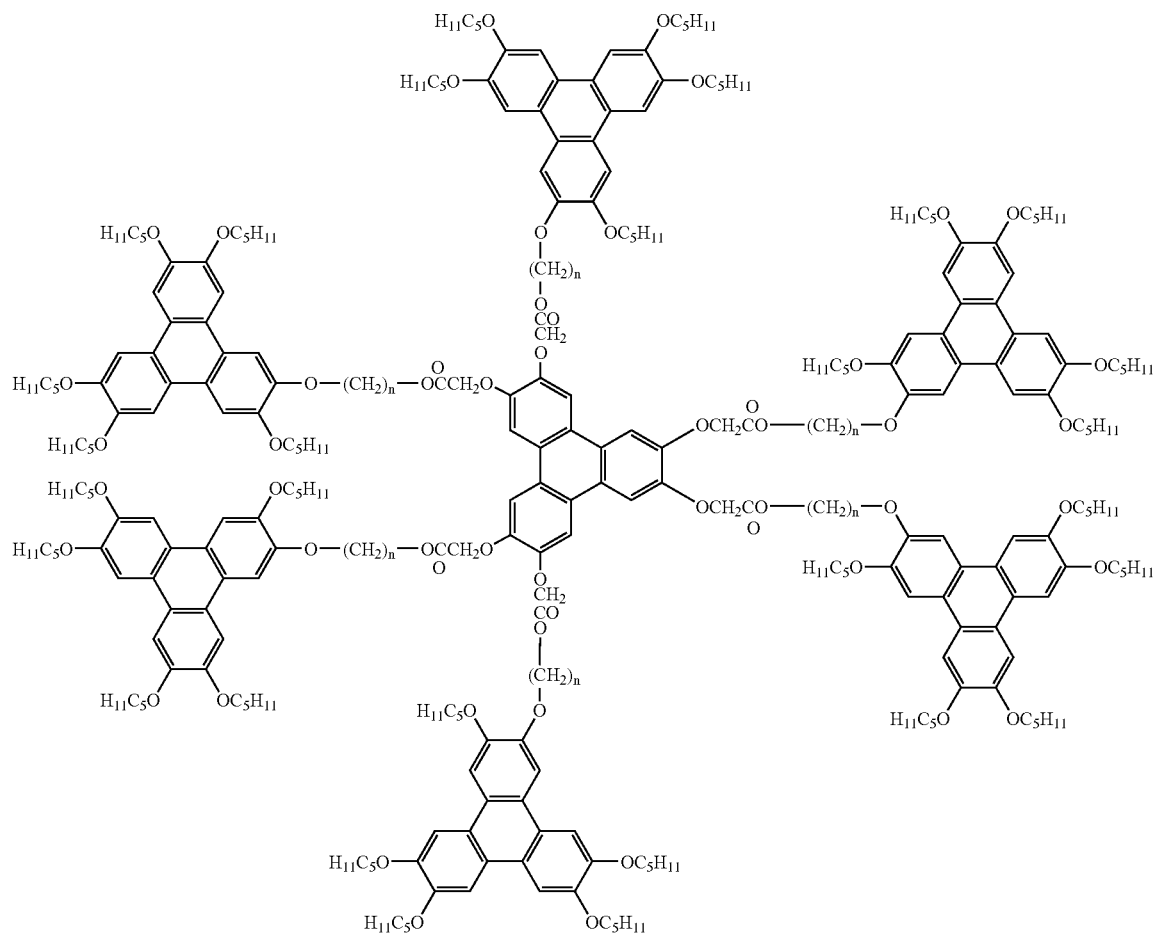
n = 6, 9, or 11

-continued

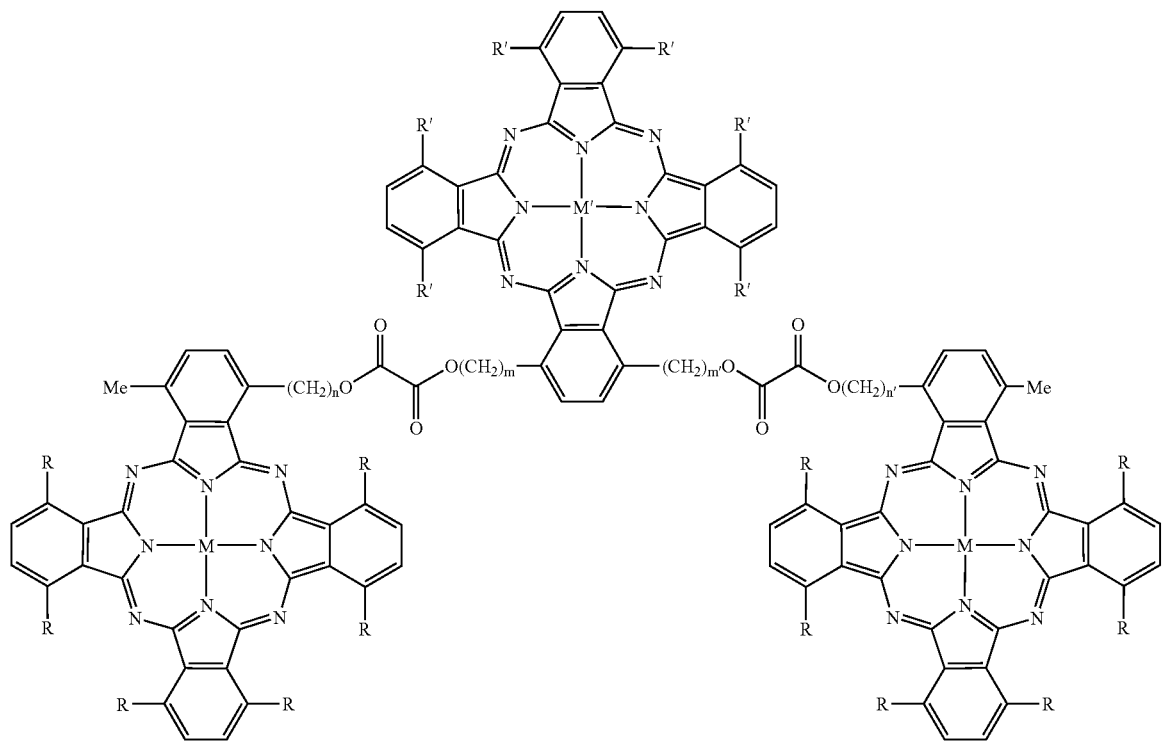

(PMD-3)

(1) R = R' = C$_8$H$_{17}$: m = n = 6; M = M' = H, H or Cu
(2) R = C$_8$H$_{17}$, R' = C$_7$H$_{15}$: m = 6, n = 5; M = Cu, M' = H, H

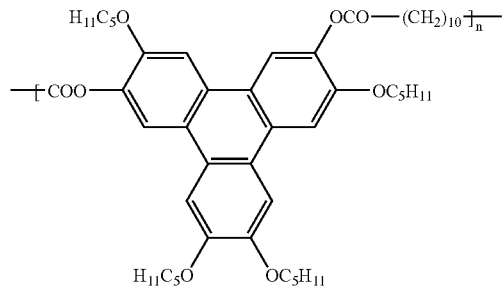

(PMD-4)

The discotic liquid crystal materials can further contain an ultraviolet absorber, a radical trapping agent, an antioxidant, a viscosity-lowering agent, a nematic liquid crystal, a smectic liquid crystal, etc.

The discotic liquid crystal is aligned in the liquid crystal device of the present invention in a manner as described below.

Figure 1B:
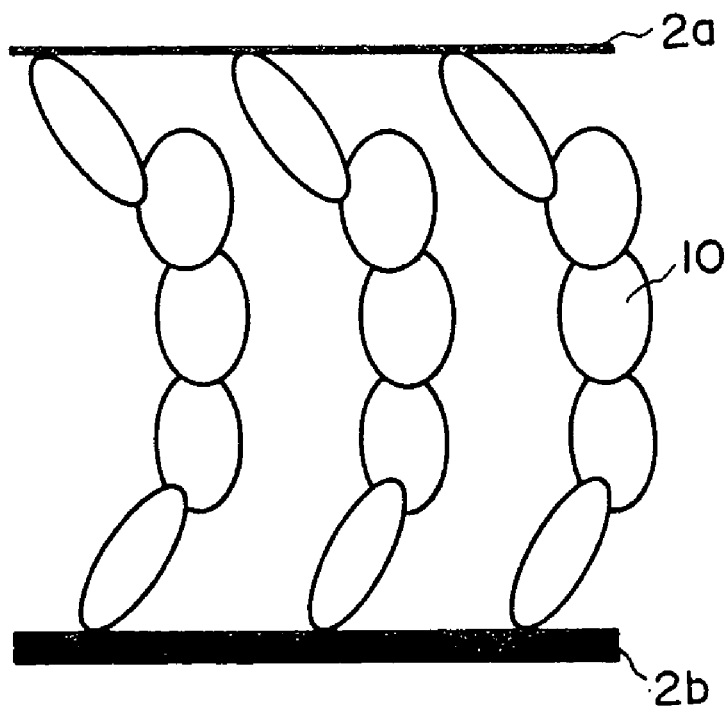
Figure 2:
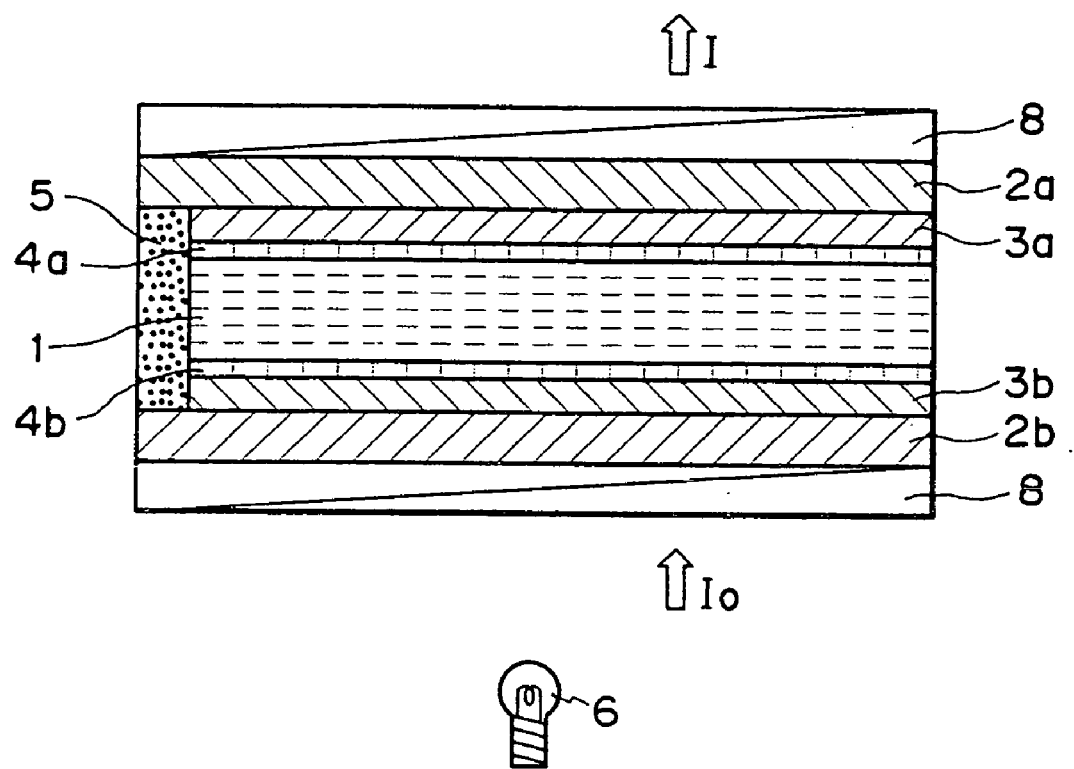
FIG. 2 is a schematic sectional view of an embodiment of the liquid crystal device according to the invention.

FIG. 2 is a schematic sectional view of a liquid crystal device formed according to the present invention. Referring to FIG. 1, the liquid crystal device includes a liquid crystal layer 1 comprising a discotic liquid crystal composition disposed between a pair of substrates 2a and 2b, which may for example comprise glass or a plastic material, and are successively coated with transparent electrodes 3a and 3b of, e.g., ITO, etc., and alignment control layers 4a and 4b. One of the alignment control layers 4a and 4b can be omitted, but at least one of the substrates 2a and 2b is required to have such an alignment control layer 4a and/or 4b having an edge-on and uniaxial alignment characteristic.

Such an alignment control film having an edge-on and uniaxial alignment characteristic may be formed by vapor deposition or sputtering on a substrate from an oblique direction of an inorganic material, such as silicon monoxide, silicon dioxide, aluminum oxide, zirconia, magnesium fluoride, cerium oxide, cerium fluoride, silicon nitride, silicon carbide or boron nitride; or surface rubbing with a fibrous material, such as velvet cloth or paper, of a film of an organic material, such as polyvinyl alcohol, polyimide, polyamide-imide, polyester, polyamide, polyester imide, polyparaxy-lylene, polycarbonate, polyvinyl acetal, polyvinyl chloride, polystyrene, polysiloxane, cellulosic resin, melamine resin, urea resin or acrylic resin.

In order to provide a better edge-on and uniaxial alignment, it is particularly preferred to use a rubbed polyimide layer. Such a polyimide alignment film may ordinarily be obtained by forming a film of a solvent-soluble polyamic acid, followed by baking for polyimide film formation. It is also possible to use a solvent-soluble polyimide showing a good voltage retentivity. Such a polyimide is preferred in view of good uniaxial alignment characteristic and high productivity. It is further preferred to use a type of polyimide film showing a homeotropic alignment characteristic with respect to ordinary rod-shaped liquid crystals when not subjected to rubbing and use such a polyimide film after a relatively intense rubbing. Such a polyimide film having a homeotropic alignment characteristic is generally given by polyimides having a weakly polar structure, as represented by those having side chains including a long-chain alkyl group, or side chains including a fluorine atom or a perfluoroalkyl group.

The liquid crystal device may further comprise a sealing member 5 formed of, e.g., an epoxy adhesive (such as "STRUCTBOND" available from Mitsui Kagaku K.K.) and also a spacer (not shown) usually disposed in the liquid crystal layer 1 for controlling a cell gap between the substrates 2a. The liquid crystal device can be further provided with one or more polarizers 8 which may be disposed in, e.g., a right-angle cross nicol relationship, and may be driven while being illuminated with incident light 10 from a backlight source 6 to provide a transmitted modulated light I.

Figure 3:
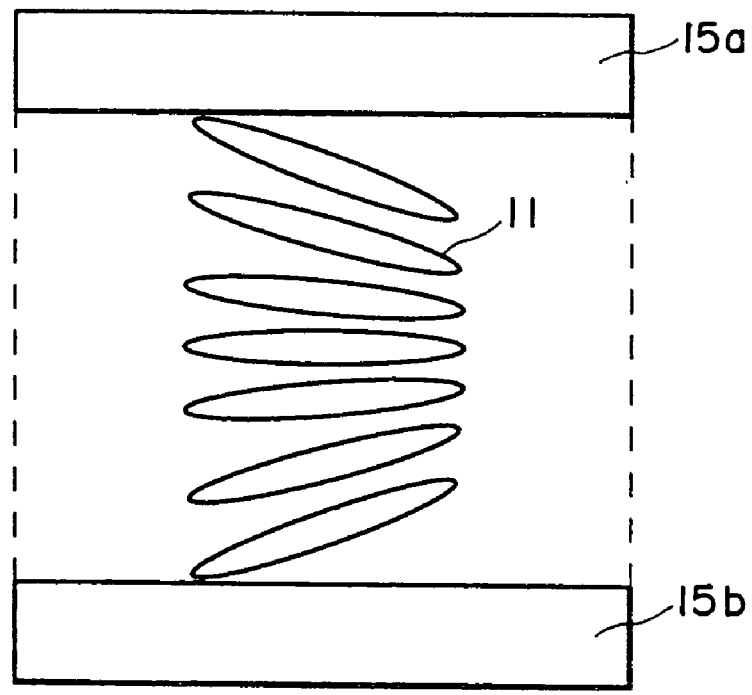
FIG. 3 is a schematic sectional view illustrating an alignment state of rod-shaped liquid crystal molecules.

The liquid crystal device of the present invention including a discotic liquid crystal placed in an edge-on and uniaxial alignment characteristic as shown in FIGS. 1A and 1B may for example be used as a phase-compensation plate and a viewing angle-compensation plate. More specifically, a discotic liquid crystal placed in an edge-on and uniaxial alignment state as shown in FIGS. 1A and 1B exhibits a refractive index anisotropy which is complementary to an alignment state of rod-shaped liquid crystal molecules 11 as shown in FIG. 3, thus providing a liquid crystal display device of a very excellent wide-viewing angle characteristic. It especially exhibits a particularly excellent matching of complementary relationship with a rod-shaped liquid crystal device of inplane-switching type, examples of which may include: the so-called IPS device and FFS device using nematic liquid crystals, and (anti-)ferroelectric liquid crystal (FLC and AFLC) devices using smectic liquid crystals, inclusive of passive devices and active devices.

Figure 4:
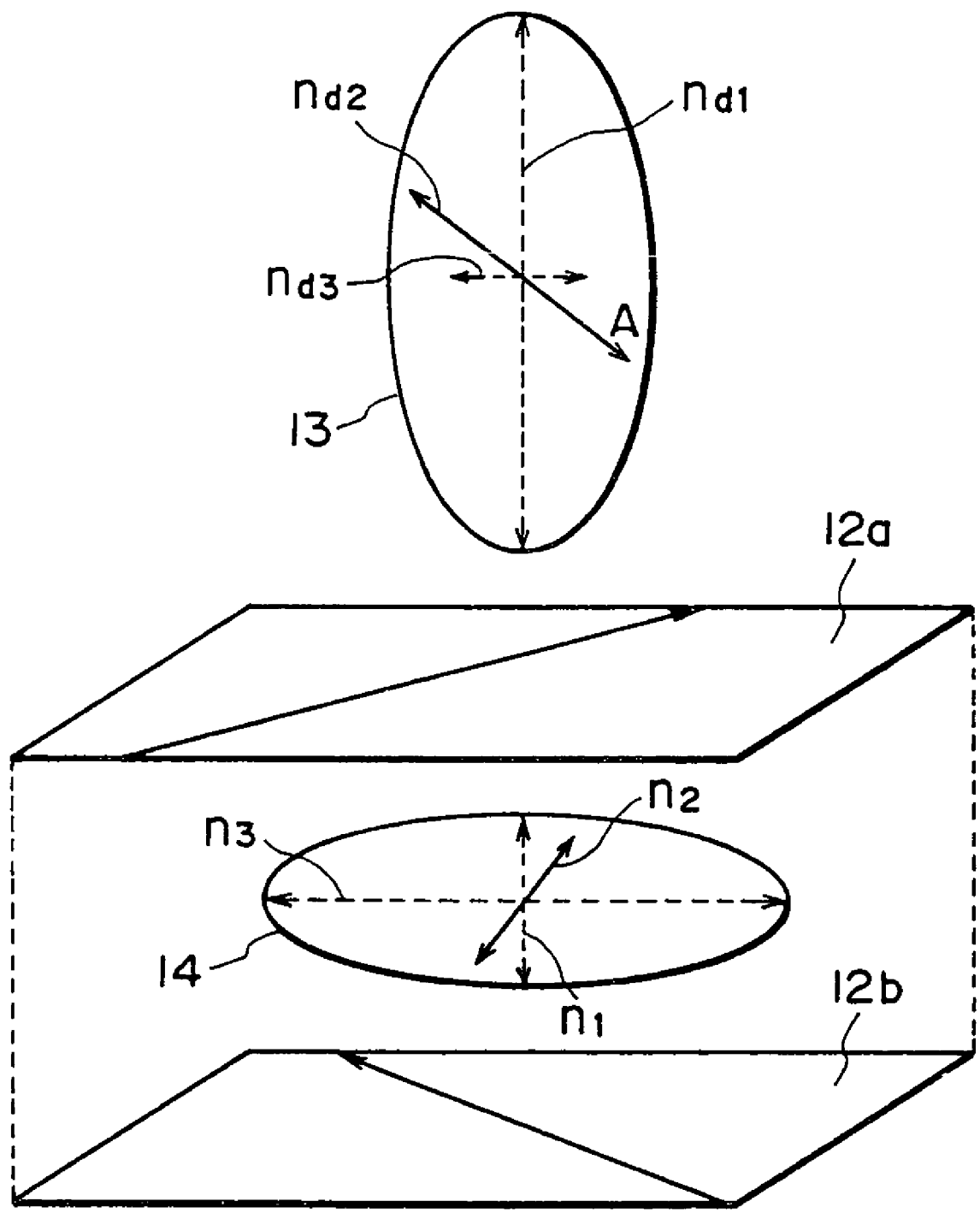
FIG. 4 is a schematic perspective view showing an optical relationship of refractive index ellipsoids of a polymeric discotic liquid crystal (upper) and a rod-shaped liquid crystal (lower) relative to polarizer positions.

FIG. 4 illustrates an arrangement of such a liquid crystal device provided with a phase compensator. More specifically, referring to FIG. 4, a rod-shaped liquid crystal device is disposed at a lower part as represented by a pair of cross nicol polarizers 12a and 12b and a rod-shaped liquid crystal represented by a refractive index ellipsoid 14, and a phase compensator a viewing angle compensator disposed above the rod-shaped liquid crystal device and comprising a discotic liquid crystal represented by a refractive index ellipsoid 13, the discotic liquid crystal may preferably comprise a polymeric one in order to exhibit a good durability and environmental stability. Such a polymeric liquid crystal may preferably be formed by forming an edge-on and uniaxial alignment state as shown in FIGS. 1A and 1B of a polymerizable discotic liquid crystal, followed by photopolymerization thereof for fixing the alignment state. It is also possible to use a polymeric discotic liquid crystal in a controlled alignment state.

The discotic liquid crystal device of the present invention can also be used as a liquid crystal device including the discotic liquid crystal as a switching liquid crystal element. The switching may be effected from the edge-on and uniaxial alignment state as one stable state to a side-on alignment state or to an edge-on and non-axial alignment state, or between different phases of edge-on uniaxial alignment states. The switching may be caused by an electric field application for causing a dielectric anisotropy torque change which can be detected by one or more polarizers. As for an electric field responsiveness of a discotic liquid crystal, a discotic liquid crystal having a negative dielectric anisotropy exhibits a more vertical disk alignment state (with its director more parallel) with respect to the substrates at a larger electric field intensity, and a discotic liquid crystal having a positive dielectric anisotropy exhibits an opposite direction of alignment state change. It is also possible to add a nematic liquid crystal or a smectic liquid crystal in order to enhance the dielectric anisotropy. The discotic liquid crystal device of this type can exhibit a higher-speed responsiveness and a broader viewing angle characteristic than a conventional liquid crystal device, thus providing an excellent liquid crystal switching device.

The liquid crystal device of the present invention utilizing a specific alignment state of discotic liquid crystal can also be used in other modes of switching liquid crystal devices.

Figure 5:
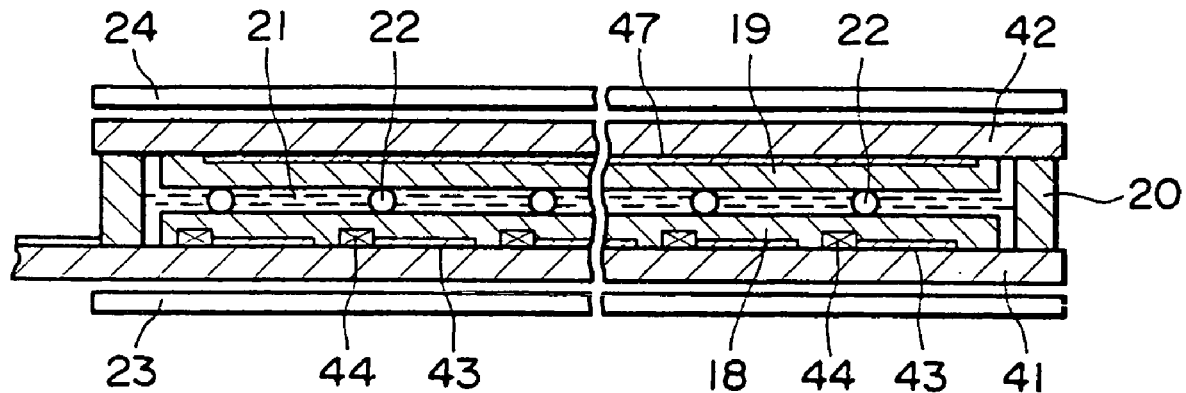
FIG. 5 is a schematic sectional view of an active matrix liquid crystal device.
Figure 6:
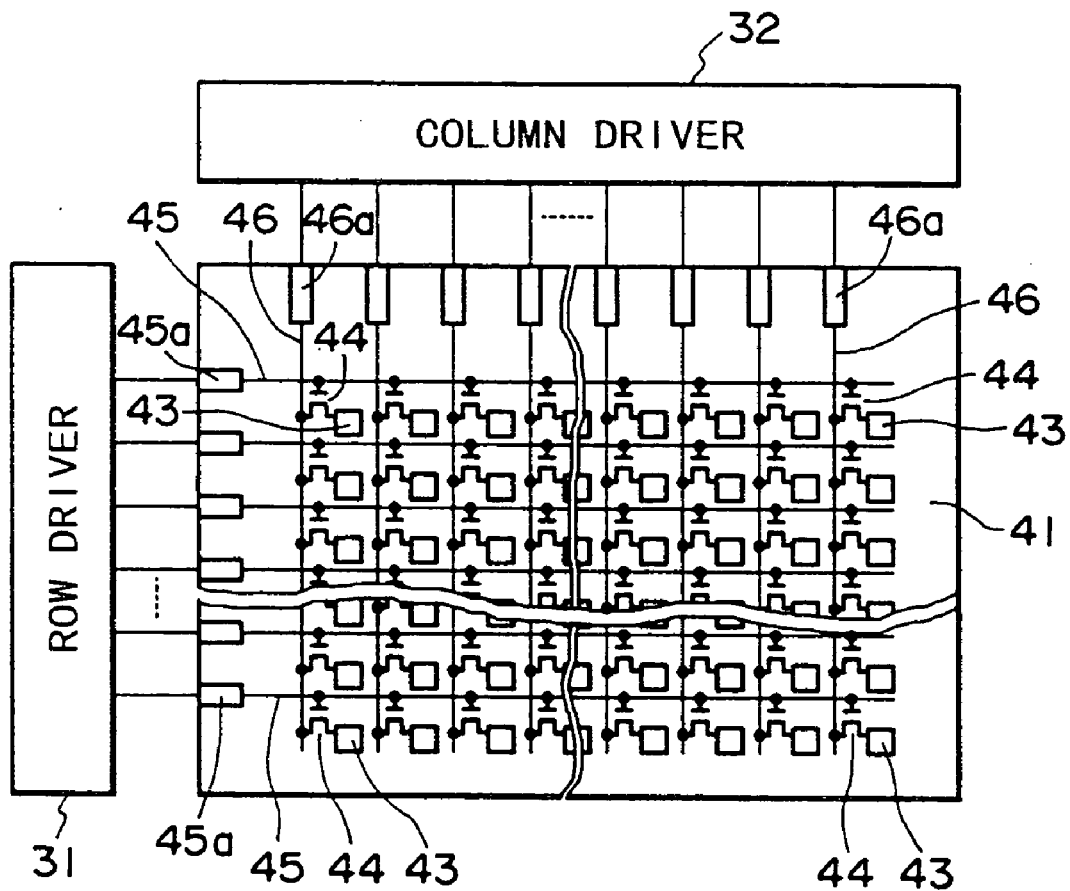
FIG. 6 is a block circuit diagram illustrating an active matrix liquid crystal device.

The liquid crystal device of the present invention can also be used together with an active (switching) element. For example, it is possible to form an active matrix-type liquid crystal device as shown in FIGS. 5 and 6 provided with an active element to a matrix of pixels each of which has an organization as described with reference to FIG. 2. Referring to FIG. 5, of transparent substrates (e.g., glass plates) 41 and 42 disposed in an opposite pair, a lower substrate 41 is provided with a plurality of transparent pixel electrodes 43 and a plurality of active (switching) elements 44 connected with the pixel electrodes, respectively, arranged in a matrix form. Each of the active elements 44 may be formed of, e.g., a thin film transistor (TFT). The TFT may comprise a semiconductor of an amorphous silicon-type, a polycrystalline silicon-type, a microcrystalline-type or a single crystalline silicon-type. As shown in FIG. 5, on the TFTs 44 and the pixel electrodes 43, an alignment control layer 18 is formed. On the other substrate 42, a transparent electrode 47 and an alignment control layer 19 are formed. Between the pair of substrates 41 and 42, a liquid crystal layer 21 is disposed together with a spacer 22 and a sealing agent 20. Each of the TFTs 44 comprises a gate electrode formed on the substrate 41, a gate insulating film formed on the gate electrode, a semiconductor layer formed on the gate insulating film, and a source electrode and a drain electrode formed on the semiconductor layer.

As shown in FIG. 6, on the (lower) substrate 41, gate (scanning) lines 45 and data signal lines 46 are disposed between the pixel electrodes 43 in a row direction and a column direction, respectively. Each of the source electrodes is connected with a corresponding gate line 45 and a corresponding data signal line 46, respectively. The gate lines 45 are connected to a row driver 31 via their terminal portions 45a and the data signal lines 46 are connected to a column driver 32 via their terminal portions 46a. The gate lines 45 are scanned by application of gate signals from the row driver 31 and the column driver 32 supplies signals corresponding to display data. The gate lines 45 are covered with the gate insulating film of the TFT 44 except for their terminal portions 45a and the data signal lines are formed on the gate insulating film. The pixel electrodes 43 are also formed on the gate insulating film and are connected with corresponding drain electrodes of the TFTs 44, respectively, at their terminal portions. On the (upper) substrate 42, as shown in FIG. 5, the transparent (counter) electrode 47 is formed so as to be counter to the respective pixel electrodes 43. The opposite electrode 47 is a single electrode extending over the entire display region and supplies a reference voltage.

When the liquid crystal device is driven, a resultant transmittance is changed depending on the data signal voltage to effect gradational display. Each of the pixels may frequently be provided with a capacitor for providing an auxiliary (storage) capacitance.

Such a matrix device can be used either a transmission type or a reflection type. The transmission-type device ordinarily includes a backlight source (like the one denoted by numeral 6 in FIG. 2). The reflection-type device is provided with a reflection layer included in the device. The liquid crystal device may be either a direct viewing-type or a projection type, and can also be used as a light valve for a printer, etc.

Thus, the liquid crystal device of the present invention can be used for constituting various liquid crystal apparatus including as a representative example a display apparatus including the liquid crystal device as a display panel, and also a drive circuit, a backlight, a light diffusion plate, etc.

Some specific examples and comparative examples are described below regarding this embodiment of the liquid crystal device according to the present invention.

EXAMPLE 1-1

A polymerizable discotic liquid crystal mixture (A) comprising three components each represented by the following formula (A) was prepared.

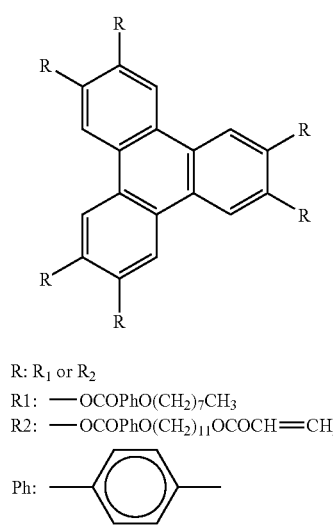

R: $R_1$ or $R_2$
R1: —OCOPhO(CH$_2$)$_7$CH$_3$
R2: —OCOPhO(CH$_2$)$_{11}$OCOCH=CH$_2$
Ph: —⌬—

More specifically, the discotic liquid crystal mixture (A) was obtained by mixing a component a1 (having a $R_1/R_2$ mol ratio of 5/1), a component a2 ($R_1/R_2$=4/2) and a component a3 ($R_1/R_3$=3/3) in weight ratios of 22:59:16. The liquid crystal mixture (A) exhibited a phase transition series of discotic rectangular phase (Dr)—(131° C.)—nematic discotic phase (Nd)—(200° C.)—isotropic phase (Iso) on temperature increase (Blank Cell α)

A blank cell α was prepared in the following manner.

Two 1.1 mm-thick glass substrates each coated with a ca. 70 nm-thick ITO transparent electrode were provided.

Each glass substrate was spin-coated twice with a 4 wt. % solution of a polyimide precursor having a homeotropic alignment characteristic ("JALS 2022", made by Nippon Gosei Gomu K. K.) at 500 rpm for 5 sec (for first coating) and at 1500 rpm for 30 sec (for second coating).

The coating was then pre-dried at 80° C. for 2 min and baked at 200° C. for 1 hour to form a 450 Å-thick polyimide film, which was then rubbed in one direction with a 80 mm-dia. rubbing roller surfaced with cotton unwoven cloth at 1000 rpm and a cotton pressing depth of 1.2 mm while being fed at a rate of 10 mm/s.

On one of the two glass substrates thus treated, a dispersion of resin beads having an average particle diameter of 10 μm at 0.01 wt. % in isopropyl alcohol (IPA) was applied by spin coating at 1500 rpm for 10 sec to disperse the spacer beads at a density of ca. 100 beads/mm$^2$, and a thermosetting adhesive was applied in a frame shape by printing.

Then, the other treated glass substrate was applied to the above-treated one glass substrate so that the rubbing directions were parallel and identical to each other, and the applied body was heated for 90 min. in an oven at 150° C. to cure the adhesive, thereby forming a blank cell α.

(Blank Cells α' and α")

Blank cells α' and α" were respectively prepared in the same manner as above except for using a 1 wt. % solution and a 2.3 wt. % solution, respectively, of the polyimide precursor to form polyimide alignment films in thickness of 170 Å and 330 Å, respectively.

(Device α1)

The above-prepared discotic liquid crystal mixture (A) was injected at 210° C. (in isotropic phase) into the above-prepared blank cell a to prepare a liquid crystal device α1. The liquid crystal device α1 was observed through a polarizing microscope while gradually cooling the device from 210° C. at a rate of 2° C./min. As a result, at 150° C., a uniform alignment state exhibiting a strong uniaxial birefringence was observed, whereby a uniform edge-on and uniaxial alignment state was confirmed.

(Devices α1' and α1")

Device α1' and α1" were prepared and evaluated in the same manner as Device α1 except for using Blank cells α' and α", respectively, instead of Blank cell α. As a result, Device α1' exhibited a side-on alignment state showing a slight uniaxial birefringence due to the rubbing. Devices α1" exhibited a region of the same alignment state as Device α1' and also a region of different alignment state showing a strong uniaxial birefringence together with a disclination between the regions.

On the other hand, Device α1 exhibited only the strong uniaxial birefringence phase observed in α1".

EXAMPLE 1-2

A liquid crystal composition B was prepared by mixing the discotic liquid crystal mixture (A) used in Example 1-1 with 25% of a nematic liquid crystal ("KN5030", made by Chisso K.K.).

The liquid crystal composition B was injected into a blank cell a identical to the one prepared in Example 1-1 to prepare a liquid crystal device α2, which was gradually cooled in the same manner as in Example 1-1. As a result, from around 60° C., a transition to Nd phase (nematic discotic) was caused, and at 50° C., a uniform alignment state exhibiting a strong uniaxial birefringence was observed, whereby a uniform edge-on and uniaxial alignment state was confirmed.

EXAMPLE 1-3

To the liquid crystal composition B prepared in Example 1-2, 1 wt. % of a photopolymerization initiator ("Irgacure 184", made by Ciba-Geigy Corp.) was added to form a composition C, which was then injected into a blank cell α identical to the one prepared in Example 1-1 and was gradually cooled in the same manner as in Example 1-1. As a result, at a constant temperature of 50° after the gradual cooling, a uniform alignment state exhibiting a strong uniaxial birefringence was observed, whereby a uniform edge-on and uniaxial alignment state was confirmed similarly as in Example 1-2.

In this state, the liquid crystal composition in the cell was exposed to ca. 12 mW/cm$^2$ of ultraviolet rays having a central wavelength of 365 nm for 5 min., thereby fixing the edge-on and uniaxial alignment state to prepare a liquid crystal device α3. The alignment state in the device α3 was retained even at an elevated temperature of 120° C.

Separately, an FLC (ferroelectric liquid crystal) cell as an in-plane switching liquid crystal device having bistability was prepared. A DC electric field was applied to the FLC cell to provide a uniformly aligned one uniform alignment state and was superposed with cross-nicol polarizers disposed to provide a dark state. Then, a DC electric field of the other polarity was applied to the FLC cell to provide the other uniform alignment state in a bright state exhibiting a maximum luminance. In this state, the FLC cell exhibited a retardation of 200 nm and a transmittance of 74% relative to the blank cell thereof superposed with parallel-nicol polarizers. When the cell was observed while changing the viewing angle in the longer-axis direction of the liquid crystal, an intense bluish tint was observed at an inclination angle of 50 deg. or larger.

Then, the discotic liquid crystal device α3 was planed on the ferroelectric liquid crystal cell, and the same viewing angle-changing test was performed, whereby the bluish tint was remarkably decreased.

EXAMPLE 1-4

The liquid crystal device α2 prepared in Example 1-2 first placed in a bright state under observation through a cross-nicol polarizing microscope and then was supplied with an AC electric field of 10 volts and 60 Hz, whereby a dark view state was formed under observation through the polarizing microscope. The electrodes of the liquid crystal device in this state was connected via a single-crystal silicon transistor (on-resistance=50 ohm) and a ceramic capacitor of 2 nF to a voltage supply, thereby obtaining an active-type liquid crystal device. The device was supplied with a drive voltage of +6 volts by applying a gate signal giving a selection period of 30 μsec, whereby modulated light was observed from the device under observation through a polarizing microscope.

As described above, according to this embodiment of the present invention, it is possible to provide a liquid crystal (display) device showing a high-viewing angle characteristic, a high contrast, a high-speed responsiveness and a high resolution at a high productivity.

Second Embodiment

According to this embodiment, there is provided a liquid crystal composition comprising a discotic liquid crystal and a rod-shaped liquid crystal in mutually phase-separated states wherein the discotic liquid crystal is placed in a nematic discotic phase, and a liquid crystal device using the liquid crystal composition wherein the discotic liquid crystal is preferably placed in an edge-on and uniaxial alignment state.

Our research group has already proposed a dispersed or phase-separation-type liquid crystal device comprising a polymeric discotic liquid crystal and a rod-shaped liquid crystal (in U.S. patent application Ser. No. 09/571,412; filed May 15, 2000). The present invention provides a liquid crystal composition allowing a higher order of alignment control wherein the discotic liquid crystal is placed in a nematic discotic phase which allows the easiest alignment control.

Thus, in the liquid crystal composition of the present invention, the discotic liquid crystal and the rod-shaped liquid crystal are disposed in mutually separate phases, and the discotic liquid crystal is placed in a nematic discotic phase. The discotic liquid crystal used for this purpose is preferably a discotic liquid crystal material showing a nematic discotic phase by itself. The liquid crystal composition of the present invention can be obtained by mixing such a discotic liquid crystal material with a rod-shaped liquid crystal material, preferably a nematic liquid crystal when the rod-shaped liquid crystal phase. All the combination comprising a discotic liquid crystal material showing a nematic discotic phase and a rod-shaped liquid crystal is used as a switching liquid crystal, in a mixing ratio providing a separate phase mixture of the nematic discotic phase and the rod-shaped liquid crystal cannot provide such a suitable mixing ratio. For this purpose, it is preferred to use a discotic liquid crystal material showing a nematic discotic phase over a broader temperature range, and it is also preferred to use a rod-shaped nematic liquid crystal showing a nematic phase over a broader temperature range. It is also preferred to take a measure of promoting the phase separation, e.g., use of mutually incompatible materials, such as a combination of a fluorine-containing nematic liquid crystal and a non-fluorine-containing discotic liquid crystal. For providing such a phase separation state over a broad temperature range, it is further preferred to fix the phase separation state by polymerizing either liquid crystal. As a result, it becomes possible to further promote the phase separation between the resultant polymeric liquid crystal phase and the remaining liquid crystal phase and suppress a re-dissolution between the two phases at a higher temperature, thereby retaining the prescribed phase separation state over a broad temperature range.

In a preferred embodiment, the rod-shaped liquid crystal is used as a switching liquid crystal and a polymeric discotic liquid crystal material is used in combination therewith. For this purpose it is preferred to use a polymerizable discotic liquid crystal material and place it in the prescribed phase separation state, followed by polymerization, e.g., photopolymerization, of the polymerizable discotic liquid crystal to fix the phase separation state. In this instance, a polymerization initiator, a stabilizer, etc. can be added as desired.

As the discotic liquid crystal materials, the above-mentioned example materials (D-1) to (D-20) and (PMD-1) to (PMD-4) may for example be used. It is possible to provide a polymerizable discotic liquid crystal compound by introducing a polymerizable group to a skeleton as represented by (D-1) to (D-20) above. Examples of polymeric discotic liquid crystal compounds formed by polymerization of such polymerizable discotic liquid crystal compounds include (PMD-1) to (PMD-4) above.

As the rod-shaped liquid crystal, a nematic liquid crystal and a smectic liquid crystal may preferably be used, but a nematic liquid crystal is particularly preferably used in view of a productivity, a material cost, and a switching characteristic. A large number of commercially available nematic liquid crystals can be used for this purpose. As smectic liquid crystals, it is possible to use an SA liquid crystal (i.e., a smectic liquid crystal having a smectic A phase), a ferroelectric liquid crystal, an anti-ferroelectric liquid crystal or a chiral smectic liquid crystal.

The liquid crystal composition of the present invention comprising a discotic liquid crystal and a rod-shaped liquid crystal in a nematic discotic phase may be used in this state but can also be used in a different state, e.g., a state wherein the discotic liquid crystal placed in a controlled alignment state in its nematic discotic phase is further transitioned into a higher-order discotic phase also with a controlled alignment state in this phase.

The liquid crystal composition of the present invention may comprise 1 to 99 wt. % of the discotic liquid crystal and 1 to 99 wt. % of the rod-shaped liquid crystal, preferably 5 to 95 wt. % of the discotic liquid crystal and 5 to 95 wt. % of the rod-shaped liquid crystal. It is also possible to incorporate additives, such as a polymerization initiator, a stabilizer, an antioxidant, a viscosity-lowering agent and a colorant, as desired.

Figure 7:
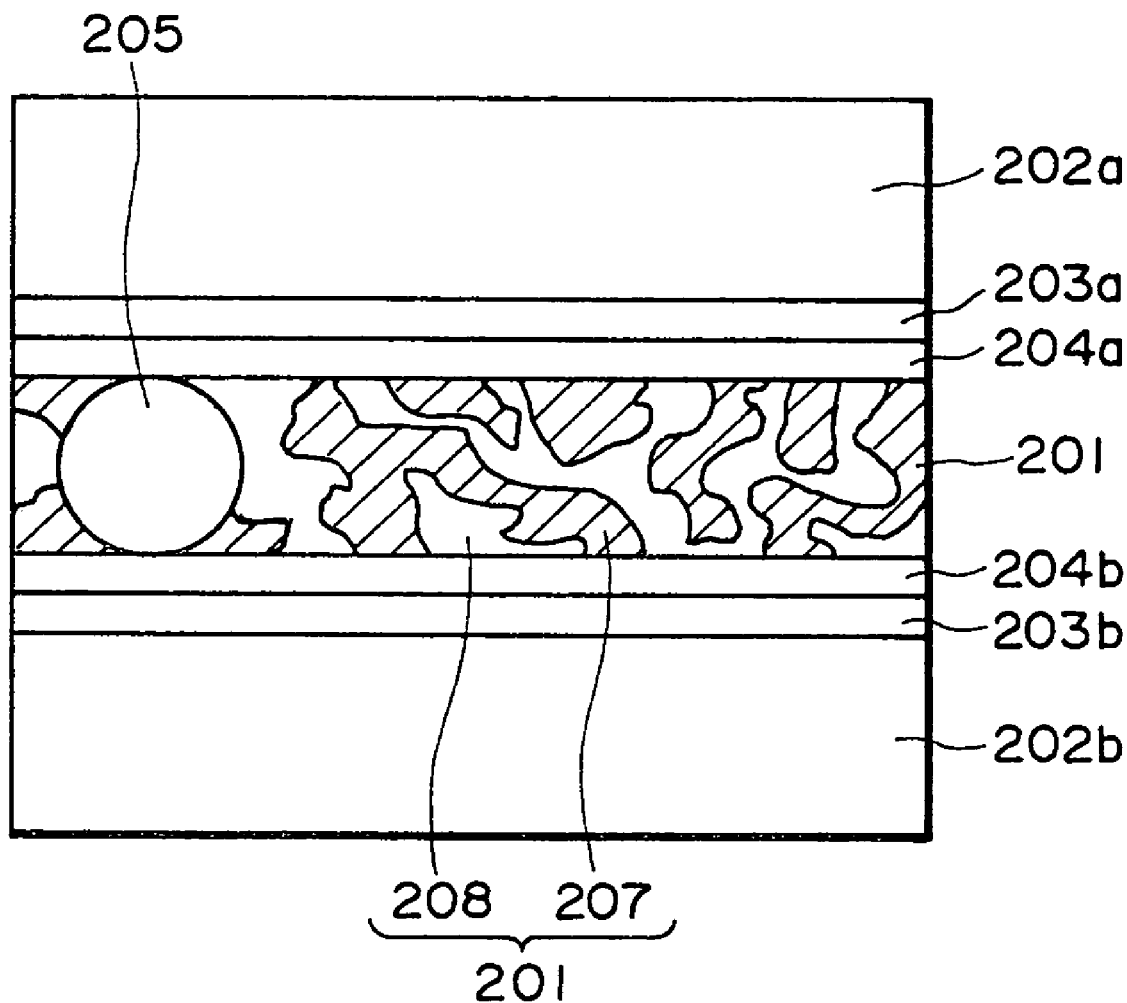
FIG. 7 is a schematic sectional view of another embodiment of the liquid crystal device according to the invention.

FIG. 7 is a schematic sectional view of a liquid crystal device including a layer of such a liquid crystal composition according to this embodiment of the present invention. More specifically, the liquid crystal device includes a liquid crystal layer 201 comprising a polymer network 208 formed of a polymeric discotic liquid crystal and also a rod-shaped liquid crystal 207 as an electric field-responsive liquid crystal. Thus, by changing an electric field applied to the liquid crystal layer 201, the alignment or orientation state of the rod-shaped liquid crystal 207 can be changed. The liquid crystal layer 201 may preferably have a thickness selected in the range of 1 μm to 10 μm. The thickness (cell gap) of the liquid crystal layer 201 may be controlled by, e.g., spacer beads 205 (only one being shown) disposed between a pair of substrates 202a and 202b which are formed of, e.g., glass or plastic. The substrates 202a and 202b are coated with transparent electrodes 203a and 203b, respectively of, e.g., ITO, and alignment control layers 204a and 204b, respectively, which can be omitted. In addition to these members, it is also possible to include a short circuit prevention layer, a light-absorbing layer, a reflection layer, a color filter layer, etc., as desired. Further, in case of using the liquid crystal device as a scattering device or a reflection device, it is possible to omit one of the substrates 202a and 202b, or to use a pair of mutually different (or asymmetrical) substrates.

In a preferred embodiment of the present invention, the discotic liquid crystal 208 phase-separated from the rod-shaped liquid crystal 207 is placed in an edge-on and uniaxial alignment state, e.g., by using a unidirectionally rubbed polyimide alignment film for the alignment control layers 204a and 204b. In this state, if the rod-shaped liquid crystal molecule 207a is switched to an orientation state (as shown in left halves of FIGS. 8A and 8B) providing an alignment director ($n_3$) which is perpendicular to the alignment director ($n_{d3}$) of the discotic liquid crystal molecule 208a within a plane parallel to the substrates. This is a state giving a minimum of refractive index difference with respect to light falling perpendicularly to the device substrates, thus providing a light transmission state. On the other hand, if the rod-shaped liquid crystal molecule is switched to an orientation state (as shown in right halves of FIGS. 8A and 8B) providing an alignment director ($n_3$) which is parallel to the alignment director ($nd_3$) of the discotic liquid crystal molecular 208a. This is a state giving a very large refractive index differences in respective directions to provide a light scattering state. By using either one (together with another state) or both (together with or without another state) of the above-mentioned two states, the liquid crystal device can perform a switching operation, e.g., according to reflection light control.

In order to effect the above-mentioned switching operation, it is necessary to perform a so-called in-plane switching of the rod-shaped liquid crystal, e.g., by disposing comb-teeth-shaped electrodes capable of causing a lateral electric field or by using, e.g., a ferroelectric liquid crystal capable of causing such in-plane switching under application of a vertical electric field across the liquid crystal layer thickness. As briefly mentioned above, the above switching operation is illustrated in FIGS. 8A and 8B based on refractive index ellipsoids of a rod-shaped liquid crystal molecule 207a and a discotic liquid crystal molecule 208a.

Figure 8A:
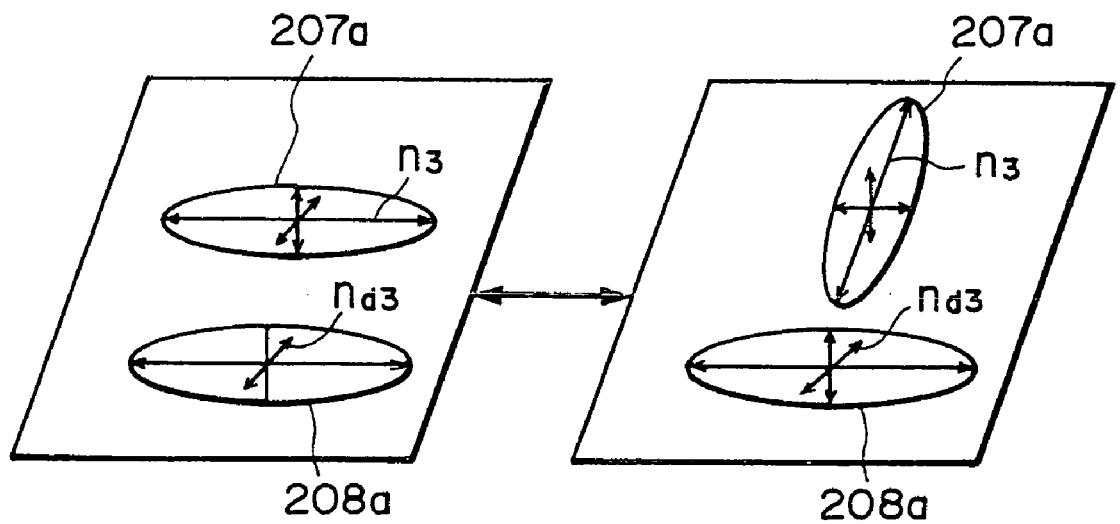
FIGS. 8A–8B are a schematic perspective view from above and a schematic side sectional view, respectively, illustrating director alignments of a rod-shaped (nematic) liquid crystal and a discotic liquid crystal.
Figure 8B:
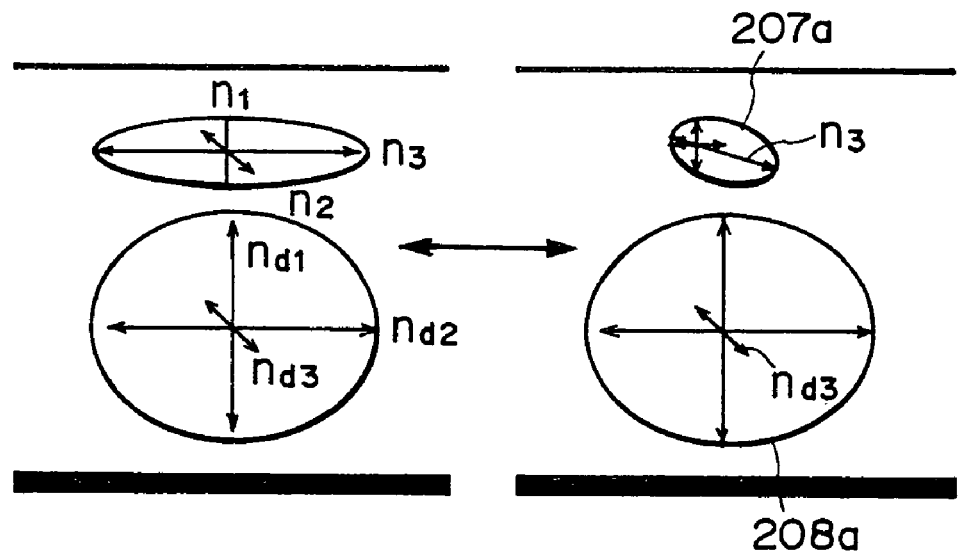

Of the two orientation states shown in FIGS. 8A and 8B, the state including mutually parallel directors ($n_3$ and $nd_3$) of the rod-shaped liquid crystal molecule 207a and the discotic liquid crystal molecule 208a (shown in right halves of FIGS. 8A and 8B) is effective for providing a strong light scattering intensity. In FIGS. 8A and 8B, the orientations of the respective liquid crystal molecules are represented by refractive index directors. More specifically, a rod-shaped liquid crystal (molecule) has two indexes $n_1$ and $n_2$ in shorter-axis directions which are smaller than a refractive index n3 in a longer-axis direction. For a nematic liquid crystal, $n_1=n_2$. On the other hand, a discotic liquid crystal (molecule) 208a assumes a round and flat bread- or disk-shaped refractive index ellipsoid including larger $n_{d1}$ and $n_{d2}$ and smaller $n_{d3}$. The reason for the strong light scattering intensity in the state of parallel directors shown in the right halves of FIGS. 8A and 8B can be explained based on typical values of refractive indices in respective axial directions of a rod-shaped liquid crystal and a discotic liquid crystal, relative to those of a matrix polymer used in an ordinary polymer dispersion-type liquid crystal device, as shown in Table 1 below.

TABLE 1

| Material | Refractive index in | | |
| --- | --- | --- | --- |
| | 1st direction | 2nd direction | 3rd direction |
| Rod-shaped liquid crystal | 1.5 ($n_1$) | 1.5 ($n_2$) | 1.7 ($n_3$) |
| Discotic liquid crystal | 1.7 ($n_{d1}$) | 1.7 ($n_{d2}$) | 1.5 ($n_{d3}$) |
| Ordinary matrix polymer | 1.5 ($n_1$) | 1.5 ($n_2$) | 1.5 ($n_3$) |

As briefly mentioned above, the light-scattering performance of a medium largely depends on a difference in refractive index between component materials copresent in phase separation with respect to incident light. As is understood from the data shown in Table 1 above, in an ordinary polymer dispersion-type liquid crystal system comprising a rod-shaped liquid crystal and an ordinary polymer, a substantial refractive index difference (1.7 ($n_3$)–1.5 ($n_3$=0.2) is found in only the third direction. On the other hand, in the phase separation system of the present invention comprising a rod-shaped liquid crystal 207a and a discotic liquid crystal 208a placed in the parallel director orientation or alignment state shown in the right halves of FIGS. 8A and 8B, such a refractive index difference is found in all the three directions. Accordingly, intense light scattering is caused at the boundary between the rod-shaped liquid crystal phase and the discotic liquid crystal phase. This has been experimentally confirmed.

In order to stably utilize the phase-separation system of a discotic liquid crystal and a rod-shaped liquid crystal over a broad temperature range, it is preferred to provide a so-called polymer dispersion liquid crystal system by polymerizing either one of the discotic liquid crystal and the rod-shaped liquid crystal, preferably the discotic liquid crystal. This can be easily achieved by photopolymerization of a polymerizable discotic liquid crystal in a state of phase-separation mixture with a rod-shaped liquid crystal as mentioned above. Alternatively, it is also possible to mix a polymeric discotic liquid crystal material with a rod-shaped liquid crystal. Examples of such polymeric discotic liquid crystals include (PMD-1) to (PMD-4) mentioned above. Other examples may include those described in JP-A 8-27284, "Macromol. Rapid Commun", Vol. 18, pp. 93–98 (1977), "EKISHO", Vol. 1, p. 45-(1977).

A reflection light control-type liquid crystal device described above can be used to constitute a liquid crystal device exhibiting very excellent luminance without requiring a backlight which is large power-consuming device. It is also possible to place a light-absorbing plate or a reflection plate (as described in, e.g., "IRDC", '94, p. 183-) to improve the luminance or contrast. The liquid crystal device of reflection type may also be used as a direct viewing-type liquid crystal display device using external light or a supplementary light source. It is also possible to use the liquid crystal device in a so-called projection-type liquid crystal apparatus wherein light incident to and modulated reflected light from the liquid crystal device is subjected to optical path control to be projected onto a screen.

In such a projection-type liquid crystal apparatus, the liquid crystal device of the present invention can be constituted as a transmission-type device instead of a reflection-type device described above.

Figure 9:
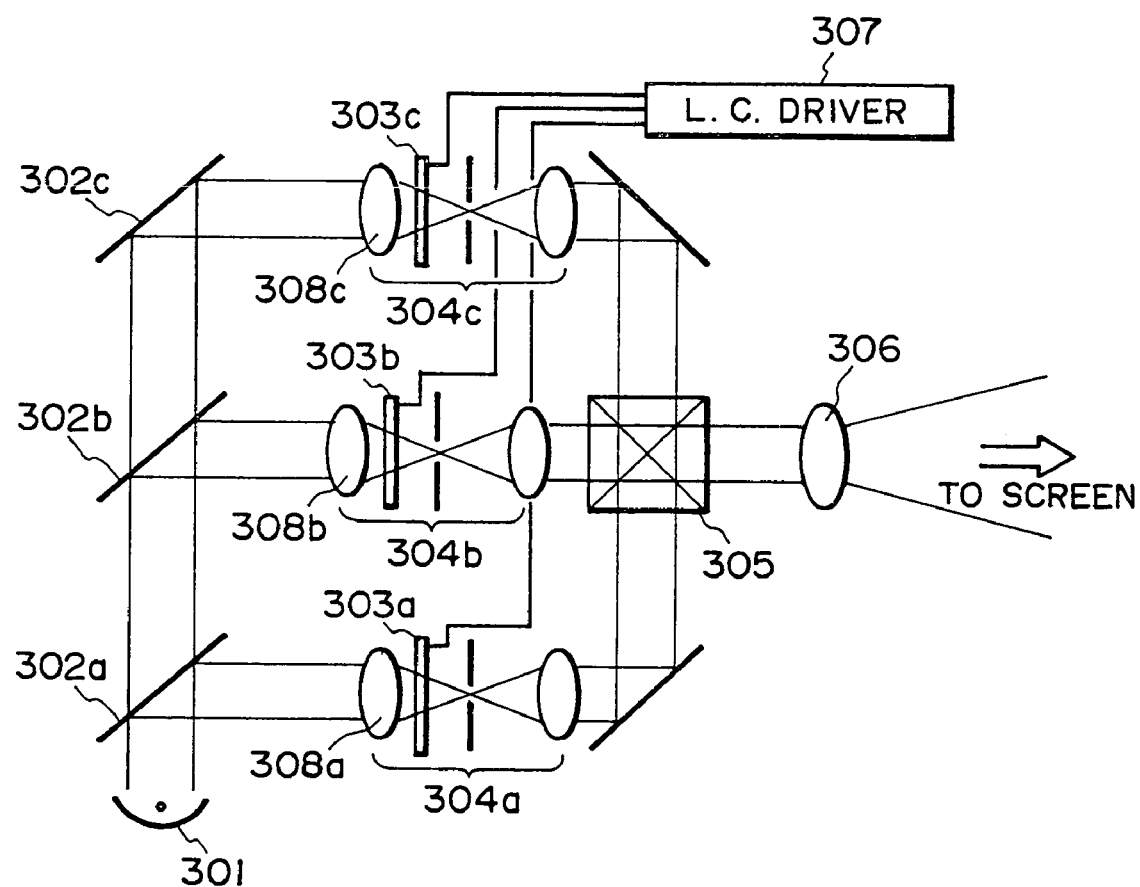
FIG. 9 is a schematic arrangement view for illustrating a projection optical system including a transmission-type liquid crystal device.

FIG. 9 illustrates a typical embodiment of the transmission-type projection liquid crystal apparatus using a Schlieren optical system. Referring to FIG. 9 three liquid crystal devices 303a, 303b and 303c for primary colors of R (red), G (green) and B (blue) are each comprised of a liquid crystal device having an electrode matrix (e.g., as an active matrix-type liquid crystal device described with reference to FIGS. 5 and 6), so that a color picture is projected and displayed onto the screen. More specifically, an incident light issued from a light source 301 is selectively reflected and color-separated into light fluxes of R, G and B by dichroic mirrors 302a, 302b and 302c to enter Schlieren optical systems 304a, 304b and 304c including a Schlieren lens 308a (308b, 308c) and the liquid crystal device 303a (303b, 303c). The light fluxes passing through the Schlieren optical systems are focused and reflected by a dichroic prism 305 to pass through a projection lens 306, thus being projected onto the screen as a color picture. Each of the liquid crystal devices 303a, 303b and 303c is driven by a liquid crystal driving means 307.

The liquid crystal device of the present invention can also be used as a light valve for a printer, a copying machine, etc. The liquid crystal device of the present invention can also be used to constitute a liquid crystal apparatus or liquid crystal device-loaded apparatus, such as mobile computers, plasma-addressed liquid crystal display apparatus, desktop computers, video cameras, digital cameras, and documentary viewers.

Because of a good switching characteristic of the liquid crystal device of the present invention as described above, such a liquid crystal apparatus can provide a high-resolution large-area display picture at a high speed with excellent drive characteristic and reliability.

Now, some specific examples of this embodiment will be described.

EXAMPLE 2-1

<Polymerizable Discotic Liquid Crystal>
The discotic liquid crystal mixture (A) used in Example 1-1 was used as a polymerizable discotic liquid crystal.

<Rod-Shaped Liquid Crystal>
A nematic liquid crystal having a dielectric anisotropy of 0.16 and a spontaneous polarization of +8 ("KN5027" made by Chisso K.K.) was used as a nematic liquid crystal (B). The liquid crystal (B) showed a phase transition series of Cryst.—(-30° C.)—nematic phase (N)—81° C.—Iso on temperature increase.

The liquid crystals (A) and (B) were mixed in a weight ratio of 50/50 to prepare Mixture liquid crystal (1).

<Blank Cell β>
Two 1.1 mm-thick glass substrates were provided. Each glass substrate was provided with comb teeth-shaped ca. 70 nm-thick ITO electrodes each in a width of 15 µm at a spacing of 50 µm so as to allow a lateral electric field application.

Each glass substrate provided with the ITO electrodes was spin-coated twice with a 4 wt. % solution of a polyimide precursor ("JALS 2022", made by Nippon Gosei K.K.) at 500 rpm for 5 sec (for first coating) and at 1500 rpm for 30 sec (for second coating). The coating was then pre-dried at 80° C. for 5 min and baked at 200° C. for 1 hour to form a polyimide film. The coatings on the two substrates were then rubbed respectively in one direction perpendicular to the comb teeth-shaped electrodes on one substrate and parallel to the comb teeth-shaped electrodes on the other substrate.

On one of the two glass substrates thus treated, a dispersion of resin beads having an average particle diameter of 10 µm at 0.01 wt. % in isopropyl alcohol (IPA) was applied by spin coating at 1500 rpm for 10 sec to disperse the spacer beads at a density of ca. 100 beads/mm$^2$, and a thermosetting adhesive was applied in a frame shape by printing.

Then, the other treated glass substrate was applied to the above-treated one glass substrate so that the rubbing directions were parallel and identical to each other, and the applied body was heated for 90 min. in an oven at 150° C. to cure the adhesive, thereby forming a blank cell β. As a result, in the blank cell β, the electrodes on an upper substrate were disposed to apply a lateral electric field parallel to the rubbing direction, and the electrodes on a lower substrate were disposed to apply an electric field perpendicular to the rubbing direction.

To Mixture liquid crystal (1) prepared above, 200 ppm of 2,6-di-t-butylphenol and 2 wt. % of a photopolymerization initiator ("Irgacure 184", made by Ciba-Geigy Corp.) were added, and the resultant mixture heated in an isotropic phase was injected into the above-prepared blank cell β under normal pressure to prepare a liquid crystal device β1. Thereafter, the liquid crystal device β1 was cooled at a rate of 10° C./min., whereby at 20° C., phase separation into a nematic discotic phase and a nematic phase was observed. This state was held for 10 min, and as a result, the transmission of intense polarized light through the nematic discotic phase was observed under observation through a polarizing microscope, whereby a uniform edge-on and uniaxial alignment state of the nematic discotic phase was confirmed. In this state, the liquid crystal device β1 was exposed to ca. 12 mW/cm$^2$ of ultraviolet rays having a central wavelength of 365 nm for 5 min. to polymerize the nematic discotic phase.

As a result of observation of the device placed on a hot stage (made by Mettler Instrumente A.G.), the alignment state after 10 min. of holding and before the polymerization of the nematic discotic phase was found to be retained over a broad range, and the texture of the discotic liquid crystal was retained even at 200° C.

An AC electric field of 110 volts and 1 kHz was applied between the electrodes on the lower substrate while keeping open the electrodes on the upper substrate to align the nematic liquid crystal molecules parallel to the substrates (an alignment state shown in the right halves of FIGS. 8A and 8B), whereby a remarkably increased scattering state was observed with eyes.

Comparative Example 2-1

A polymerizable composition was prepared in the same manner as in Example 2-1 except for using hexylene diacrylate instead of the polymerizable discotic liquid crystal mixture (A) (i.e., a 50/50 (by weight) mixture of hexylene diacrylate and "KN-5027", together with 2,6-di-t-butylphenol and polymerization initiator).

The polymerizable composition was injected into a blank cell β identical to the one in Example 2-1 and subjected to UV-exposure for polymerization similarly as in Example 2-1 to prepare a polymer dispersion-type liquid crystal device β.comp.

The device β.comp was backed by a black light-absorbing plate and subjected to measurement of a reflected light intensity at an exit light angle of 0 deg. in response to incident light at an angle of 30 deg. by using an automatic polarizing photometer ("GP-200", made by K.K. Murakami Shikisai Gijusu Kenkyusho).

The same reflected light intensity measurement was also performed by using the liquid crystal device β1 under the application of AC 110 volts and 1 kHz obtained by Example 2-1. As a result, the liquid crystal device β1 exhibited a reflected light intensity which was 3.4 times that obtained by the liquid crystal device β.comp.

EXAMPLE 2-2

The liquid crystal device β1 prepared in Example 2-1 was subjected to AC voltage application of 110 volts and 1 kHz between the electrodes on the upper substrate while opening the electrodes on the lower substrate, and a reflected light intensity in this state was measured.

As a result, the alignment state obtained by the application of AC voltage of 110 volts and 1 kHz to the electrodes on the upper substrate (in this Example) and the alignment state obtained by the application of the same voltage (obtained in Example 2-1) exhibited a reflected light intensity ratio of 1.0:1.43, thus showing a clear contrast therebetween.

As described above, according to the present invention, there is provided a liquid crystal device which is usable as a liquid crystal device, an optical modulation device and a display device exhibiting high luminance and high performances. By using the liquid crystal device showing high luminance and high performances, liquid crystal apparatus showing various performances can be realized.

What is claimed is:

1. A liquid crystal device comprising:
a pair of substrates each provided with electrodes to create a lateral electric field and a polymerized nematic discotic liquid crystal and a rod-shaped liquid crystal disposed between said pair of substrates,
wherein said polymerized nematic discotic liquid crystal is placed in an edge-on and uniaxial alignment state between said pair of substrates, said polymerized nematic discotic liquid crystal and said rod-shaped liquid crystal are placed in mutually separate phases, and said liquid crystal device causes light scattering when directors included in each of said mutually separate phases are parallel.

2. The liquid crystal device according to claim 1, wherein said polymerized nematic discotic liquid crystal is formed by photopolymerization of a polymerizable discotic liquid crystal compound.

* * * * *

UNITED STATES PATENT AND TRADEMARK OFFICE
CERTIFICATE OF CORRECTION

PATENT NO.        : 7,057,680 B2
APPLICATION NO. : 10/910405
DATED             : June 6, 2006
INVENTOR(S)       : Koichi Sato It is certified that error appears in the above-identified patent and that said Letters Patent is hereby corrected as shown below:

COLUMN 3:
Line 64, "1A an" should read --1A and--.

COLUMN 9:
Lines 6-22

"
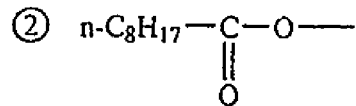
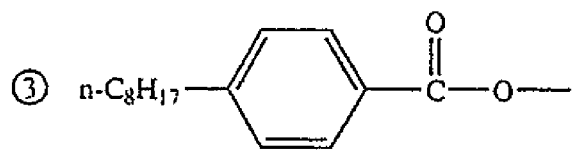
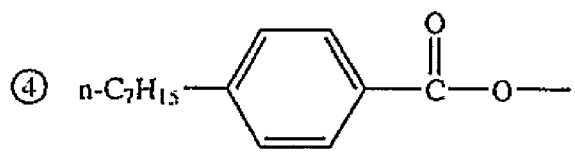
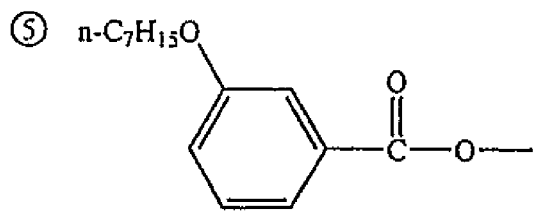
"

UNITED STATES PATENT AND TRADEMARK OFFICE
CERTIFICATE OF CORRECTION

PATENT NO.         : 7,057,680 B2
APPLICATION NO. : 10/910405
DATED                   : June 6, 2006
INVENTOR(S)        : Koichi Sato It is certified that error appears in the above-identified patent and that said Letters Patent is hereby corrected as shown below:

COLUMN 9:
Lines 6-22 (cont'd)

should read

-- R:

(m = 2, 3, ···, 15)

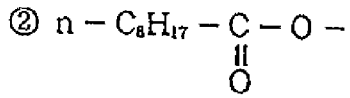

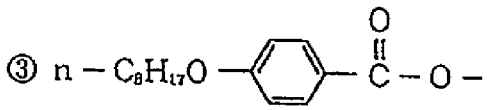

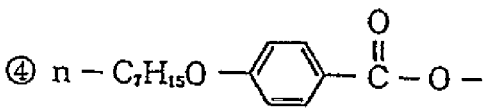

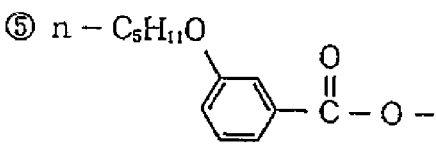

--

COLUMN 18:
Line 60, "cell a" should read --cell α--.

UNITED STATES PATENT AND TRADEMARK OFFICE
CERTIFICATE OF CORRECTION

PATENT NO. : 7,057,680 B2
APPLICATION NO. : 10/910405
DATED : June 6, 2006
INVENTOR(S) : Koichi Sato It is certified that error appears in the above-identified patent and that said Letters Patent is hereby corrected as shown below:

COLUMN 23:
Line 27, "is large" should read --is a large--.

Signed and Sealed this

Twenty-third Day of October, 2007

JON W. DUDAS
*Director of the United States Patent and Trademark Office*